(12) United States Patent
Kohara et al.

(10) Patent No.: US 6,707,406 B2
(45) Date of Patent: Mar. 16, 2004

(54) SEMICONDUCTOR DEVICE FOR INVERTER CONTROL AND CONTROL METHOD

(75) Inventors: Masaru Kohara, Osaka (JP); Koji Kawamichi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/425,676

(22) Filed: Apr. 30, 2003

(65) Prior Publication Data

US 2003/0201926 A1 Oct. 30, 2003

Related U.S. Application Data

(63) Continuation of application No. 09/987,561, filed on Nov. 15, 2001, now Pat. No. 6,573,849.

(30) Foreign Application Priority Data

Nov. 24, 2000 (JP) .................................... 2000-357440

(51) Int. Cl.⁷ ............................ H03M 1/00; H02P 5/34; H02P 7/42
(52) U.S. Cl. ........................................ 341/141; 318/802
(58) Field of Search ......................... 341/141; 318/802, 318/268, 434, 500, 700, 722, 723, 801, 811

(56) References Cited

U.S. PATENT DOCUMENTS

| | | | |
|---|---|---|---|
| 4,316,132 A | * | 2/1982 | Geppert ................ 318/723 |
| 5,349,351 A | | 9/1994 | Obara et al. |
| 5,475,290 A | | 12/1995 | Tani et al. |
| 5,811,957 A | * | 9/1998 | Bose et al. ............... 318/802 |
| 6,060,859 A | | 5/2000 | Jonokuchi |
| 6,198,240 B1 | | 3/2001 | Notohara et al. |
| 6,515,446 B1 | | 2/2003 | Koide et al. |
| 6,573,849 B2 | * | 6/2003 | Kohara et al. ............ 341/141 |

FOREIGN PATENT DOCUMENTS

| | | |
|---|---|---|
| JP | 07-256149 | 10/1995 |
| JP | 10-155201 | 6/1998 |
| JP | 11-316042 | 11/1999 |
| JP | P2000-14162 A | 1/2000 |

\* cited by examiner

*Primary Examiner*—Patrick Wamsley
(74) *Attorney, Agent, or Firm*—McDermott, Will & Emery

(57) ABSTRACT

A microcomputer for performing an inverter control includes three AD converters provided therein. The first and second AD converters are used for a motor control, and each receive a motor position detection signal. The third AD converter is used for a power supply control, and receives an analog signal representing the state of the power supply. Therefore, a motor control and a power supply control are performed by using separate AD converters, whereby it is possible to optimally perform each control without an AD conversion having to wait for another AD conversion to be completed.

3 Claims, 8 Drawing Sheets

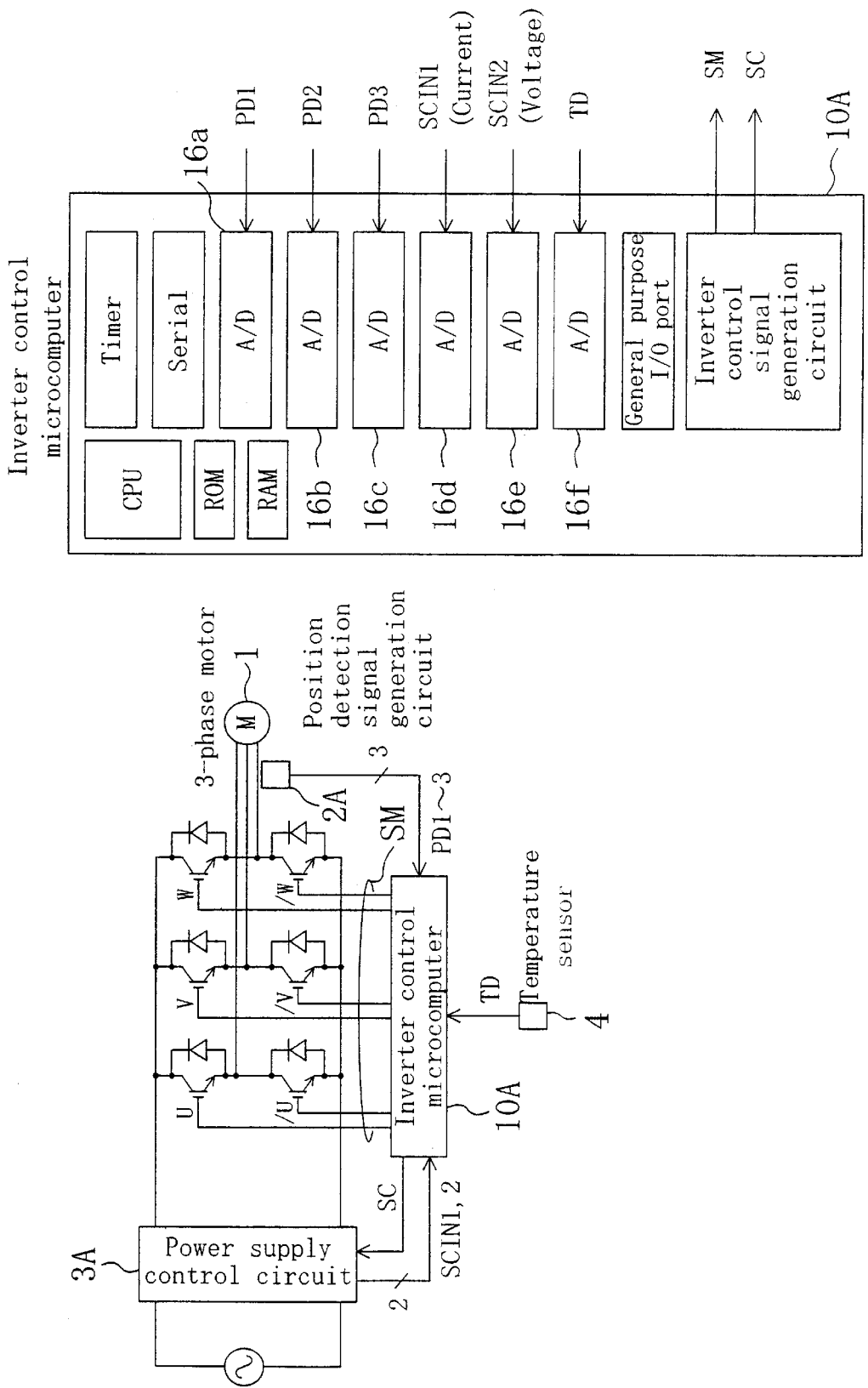

SEMICONDUCTOR DEVICE FOR INVERTER CONTROL AND CONTROL METHOD

This application is a continuation of application Ser. No. 09/987,561 filed Nov. 15, 2001 is now a U.S. Pat. No. 6,573,849.

BACKGROUND OF THE INVENTION

The present invention relates to a semiconductor device for performing an inverter control provided with AD converters, and a control method using the same.

FIG. 8A and FIG. 8B are diagrams illustrating a general structure of a conventional motor control device. The structure of FIG. 8A employs an inverter control microcomputer 60 for an inverter control of a motor 71. As illustrated in FIG. 8B, the inverter control microcomputer 60 includes an inverter control signal generation circuit 65 and an AD converter 66, in addition to a CPU 61, a ROM 62, a RAM 63, an I/O port 64, etc.

In the prior art, in order to meet the demand for conserving energy, an analog value is used as a position detection signal, and the input analog value is converted into a digital value by using an AD converter provided in a microcomputer so as to perform a control using the digital value. Specifically, the inverter control microcomputer 60 converts an input position detection signal into a digital value using the AD converter 66, and calculates the position of the rotor of the motor using the CPU 61. An inverter control signal is generated by the inverter control signal generation circuit 65 based on the position data so as to control the motor.

When driving a 3-phase motor, two analog signals are preferably used as position detection signals. However, with the structure of FIG. 8B, having only one AD converter, two analog signals need to be AD-converted one by one. Since the two signals cannot be AD-converted simultaneously, there will be a certain shift in conversion timing between the two signals. However, the motor 71 is always rotating, whereby the shift in detection timing between the two signals may cause a problem in terms of the control precision.

In order to solve such a problem, a microcomputer provided with two AD converters 67a and 67b, as illustrated in FIG. 9, has been commercialized. The use of such a microcomputer allows for simultaneous AD conversion of two position detection signals, thereby enabling a high-precision control.

PROBLEMS TO BE SOLVED BY THE INVENTION

Regarding an inverter control of a motor, the revision of Japanese Law concerning the Rational Use of Energy and the introduction of Limits for Harmonic Current Emissions have necessitated a control of the power to be supplied to the motor in addition to the need to efficiently control the motor.

The power supply can be controlled, for example, by separately providing an analog circuit, or using a microcomputer or a DSP, for controlling the power supply, as illustrated in FIG. 10. However, with such a method, the size of the system as a whole increases, thereby increasing the production cost.

SUMMARY OF THE INVENTION

An object of the present invention is to provide a semiconductor device for an inverter control of a motor capable of appropriately performing a power supply control in addition to a motor control.

Specifically, the present invention provides a semiconductor device for performing an inverter control of a motor, including: a plurality of AD converters each converting an input analog signal into a digital signal; and a control circuit for processing the digital signals output from the plurality of AD converters so as to generate a control signal, wherein at least one of the plurality of AD converters is not used for controlling the motor but used for controlling a power supply of the motor while receiving an analog signal representing a state of the power supply.

With the semiconductor device, at least one of the plurality of AD converters is not used for controlling the motor but used for controlling the power supply of the motor. Therefore, an AD conversion for a power supply control can be performed simultaneously with that for a motor control. Thus, it is possible to prevent an AD conversion from being delayed due to a contention between the timing of an AD conversion for a motor control and that for a power supply control, whereby it is possible to set appropriate carrier frequencies for a motor control and for a power supply control. Therefore, it is possible to appropriately perform a motor control and a power supply control together without adding any new hardware for a power supply control.

In the semiconductor device for performing an inverter control, it is preferred that the plurality of AD converters and the control circuit are provided in a 1-chip microcomputer.

The present invention also provides a method for performing an inverter control of a motor, including: a first step of converting an analog signal representing a state of the motor into a digital signal and performing an inverter control of the motor by using the conversion result; and a second step of converting an analog signal representing a state of a power supply of the motor into a digital signal and controlling the power supply by using the conversion result, wherein the first step and the second step are performed by using separate AD converters provided in a single semiconductor device.

The present invention also provides a method for performing an inverter control of motors, including: a first step of converting an analog signal representing a state of a first motor into a digital signal and performing an inverter control of the first motor by using the conversion result; and a second step of converting an analog signal representing a state of a second motor into a digital signal and performing an inverter control of the second motor by using the conversion result, wherein the first step and the second step are performed by using separate AD converters provided in a single semiconductor device.

The present invention also provides a semiconductor device for performing an inverter control of a motor, including: a number of AD converters each converting an input analog signal into a digital signal; and a control circuit for processing the digital signals output from the AD converters so as to generate a control signal, wherein the number of AD converters is three or more.

In the semiconductor device for performing an inverter control of a motor, it is preferred that the AD converters and the control circuit are provided in a 1-chip microcomputer.

BRIEF DESCRIPTION OF THE DRAWINGS

FIG. 6A and FIG. 6B are diagrams illustrating a general structure of a motor control device according to a second embodiment of the present invention.

DETAILED DESCRIPTION OF THE INVENTION

Various embodiments of the present invention will now be described with reference to the drawings.

FIRST EMBODIMENT

Figure 1:
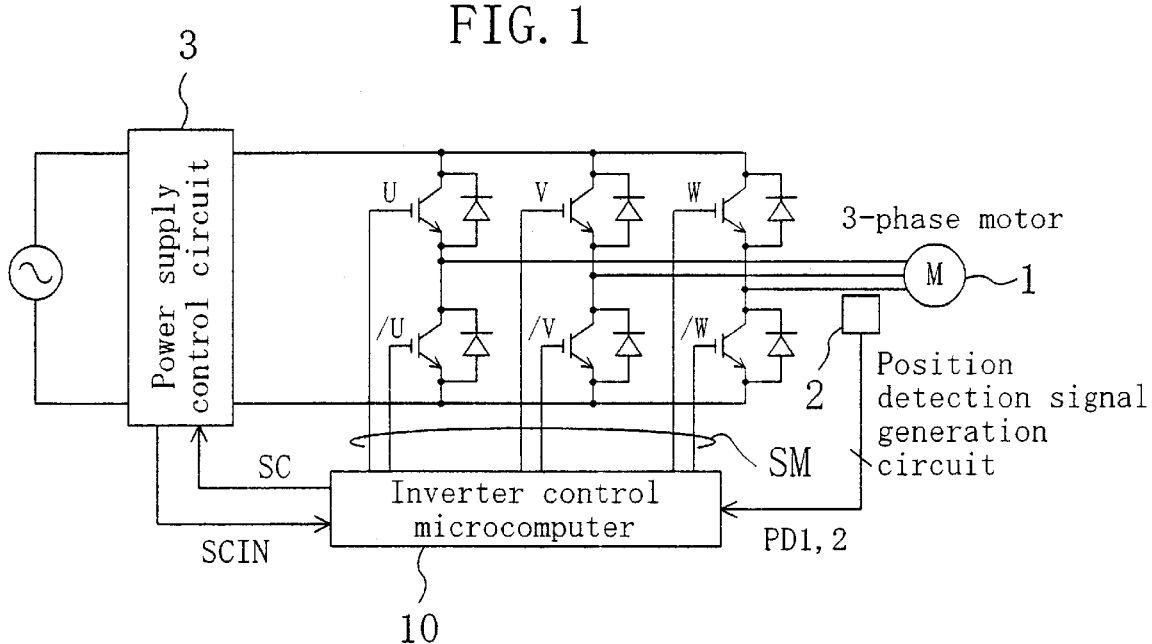
FIG. 1 is a diagram illustrating a general structure of a motor control device according to a first embodiment of the present invention.

FIG. 1 is a diagram illustrating a general structure of a motor control device according to a first embodiment of the present invention. With the structure of FIG. 1, an inverter control of a 3-phase motor 1 and a control of the power supply of the 3-phase motor 1 are performed by an inverter control microcomputer 10, which is a semiconductor device for an inverter control.

Figure 2:
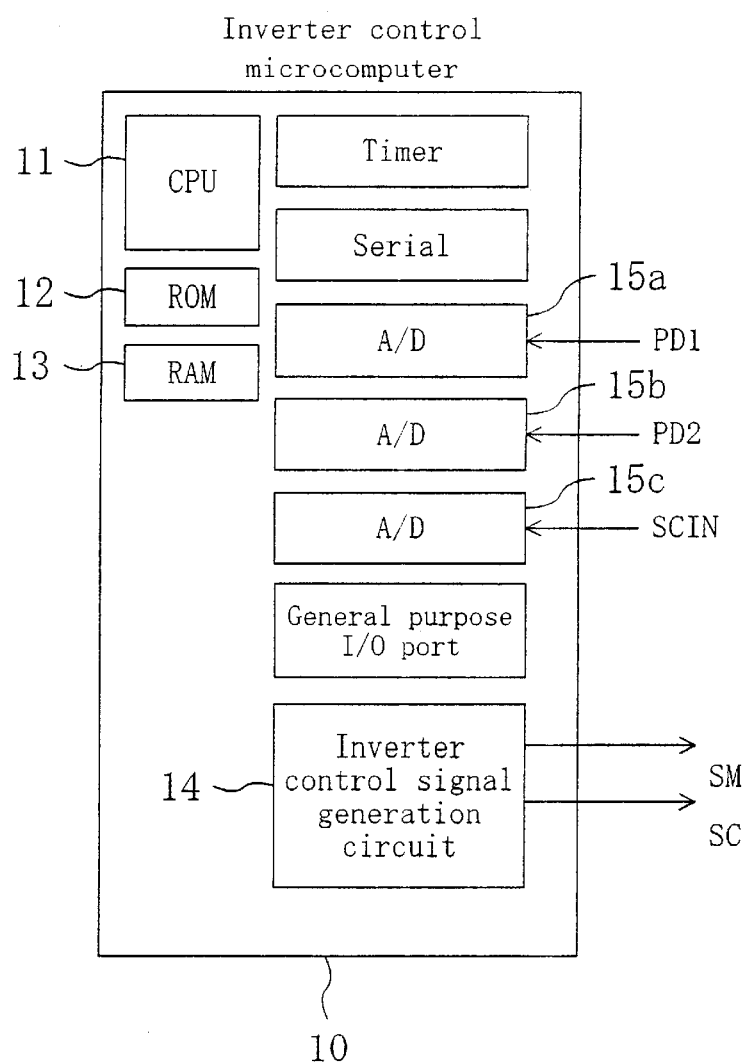
FIG. 2 is a diagram illustrating an internal structure of an inverter control microcomputer illustrated in FIG. 1.

FIG. 2 is a diagram illustrating an internal structure of the inverter control microcomputer 10. As illustrated in FIG. 2, the inverter control microcomputer 10 includes three AD converters 15a, 15b and 15c, in addition to a CPU 11, a ROM 12, a RAM 13 and an inverter control signal generation circuit 14, all provided in a 1-chip microcomputer. The AD converters 15a, 15b and 15c convert input analog signals into digital signals independently of one another. In other words, the inverter control microcomputer 10 illustrated in FIG. 2 is capable of simultaneously AD-converting up to three input signals. The CPU 11, the ROM 12, the RAM 13 and the inverter control signal generation circuit 14 together form a control circuit for processing digital signals output from the AD converters 15a, 15b and 15c so as to generate a control signal SM.

The inverter control microcomputer 10 illustrated in FIG. 2 operates as follows. The first and second AD converters 15a and 15b respectively receive position detection signals PD1 and PD2 that are output from a position detection signal generation circuit 2 provided for the 3-phase motor 1. The position detection signals PD1 and PD2 are analog signals representing the position of the rotor of the 3-phase motor 1. The first and second AD converters 15a and 15b respectively convert the received position detection signals PD1 and PD2 into digital signals. The CPU 11 executes a program stored in the ROM 12 to process the digital signals output from the first and second AD converters 15a and 15b so as to calculate the position of the rotor in the 3-phase motor 1. The inverter control signal generation circuit 14 generates a motor control signal SM based on the calculation result.

The third AD converter 15c receives a power supply control input signal SCIN output from a power supply control circuit 3. The power supply control input signal SCIN is an analog signal representing a power supply voltage, a power supply current, or the like. The third AD converter 15c converts the received power supply control input signal SCIN into a digital signal. The CPU 11 processes the digital signal output from the third AD converter 15c, and the inverter control signal generation circuit 14 generates a signal SC for a power supply control based on the calculation result.

Figure 3:
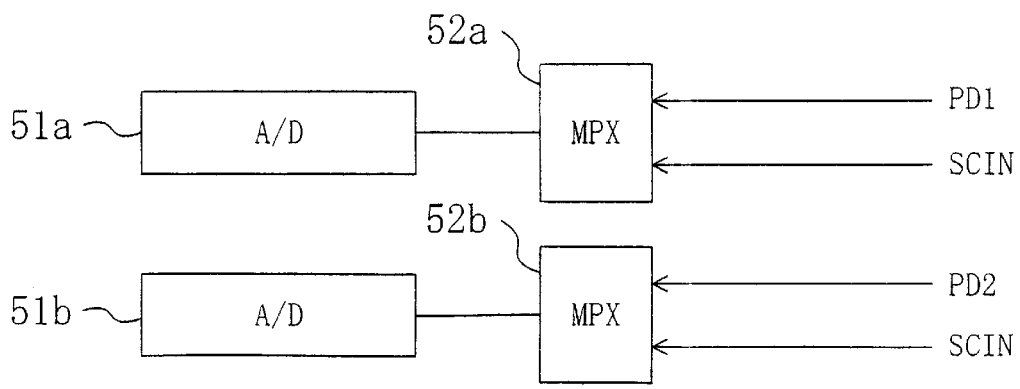
FIG. 3 is a diagram illustrating a conventional structure for switching inputs to an AD converter from one to another.

Effects of the present embodiment will now be described in comparison with a conventional structure.

Where a motor and a power supply thereof are controlled by a 1-chip microcomputer with the conventional structure, the input signals PD1 and PD2 for a motor control and the input signals SCIN for a power supply control need to be selectively input to AD converters 51a and 51b while being switched from one to another by using multiplexers 52a and 52b, or the like, as illustrated in FIG. 3. In such a case, however, the input signals PD1 and PD2 for a motor control and the input signals SCIN for a power supply control cannot be AD-converted simultaneously.

Therefore, it is necessary to appropriately set the control timings so that the timing of an AD conversion for a motor control and that for a power supply control do not contend with each other. Moreover, due to such a limitation on timing, it is necessary to restrict the control cycle (carrier cycle) for a motor control and that for a power supply control.

Figure 4:
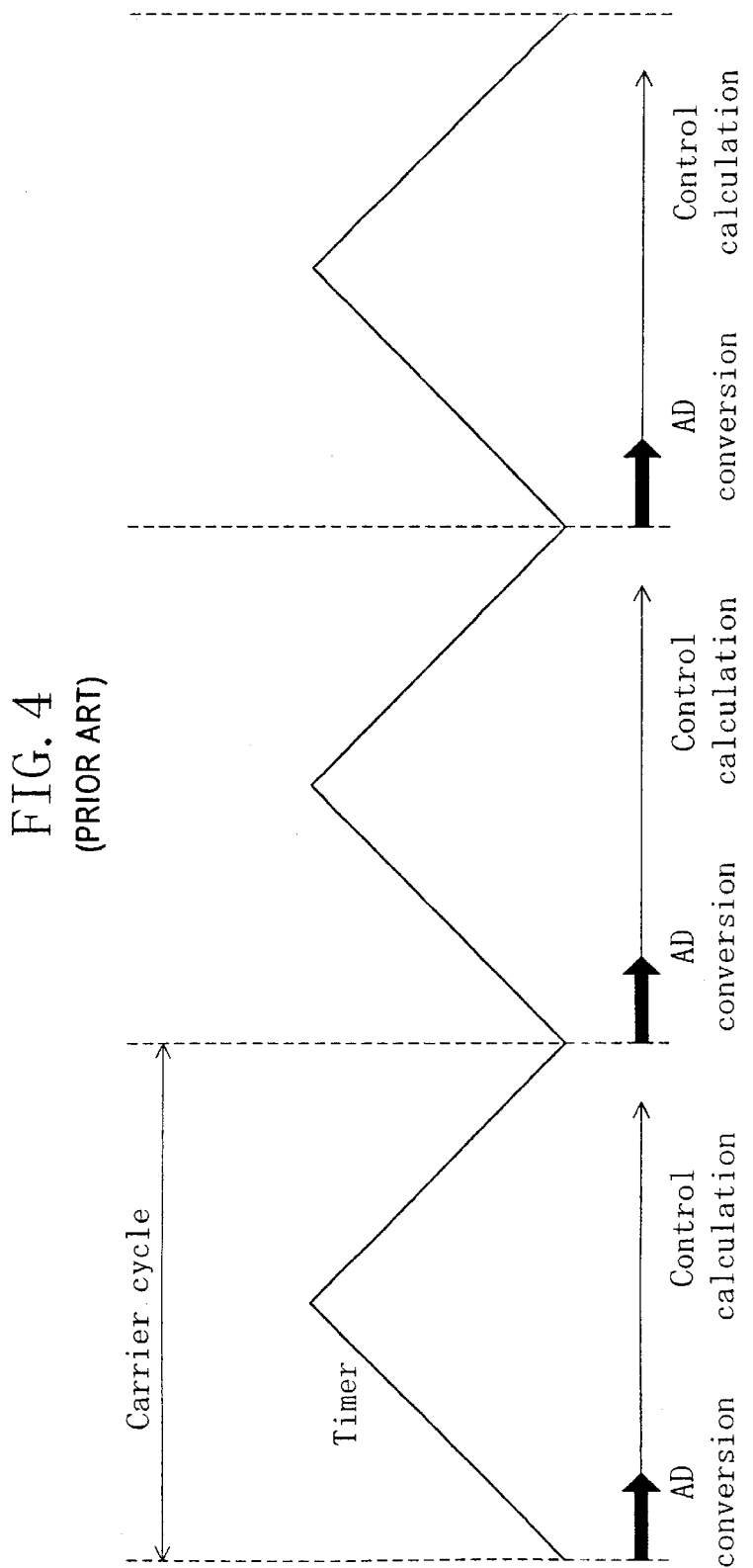
FIG. 4 is a conceptual diagram illustrating a temporal relationship between a carrier cycle of a control and an AD conversion.

FIG. 4 is a conceptual diagram illustrating a temporal relationship between a carrier cycle and an AD conversion. Normally, an AD conversion is performed and a control calculation is performed using the obtained digital signal for each carrier cycle, as illustrated in FIG. 4. Therefore, the timing at which to perform an AD conversion is determined by the carrier cycle. Moreover, since it is necessary to perform the AD conversion and the control calculation for each carrier cycle, it is necessary to satisfy the following relationship:

AD conversion time+Control calculation time <Carrier cycle

When designing a system, it is done so that the above condition is satisfied. If the condition is not satisfied, it is necessary to take measures such as to use a CPU with a higher computing power or to provide an AD converter with a higher conversion speed.

Figure 5:
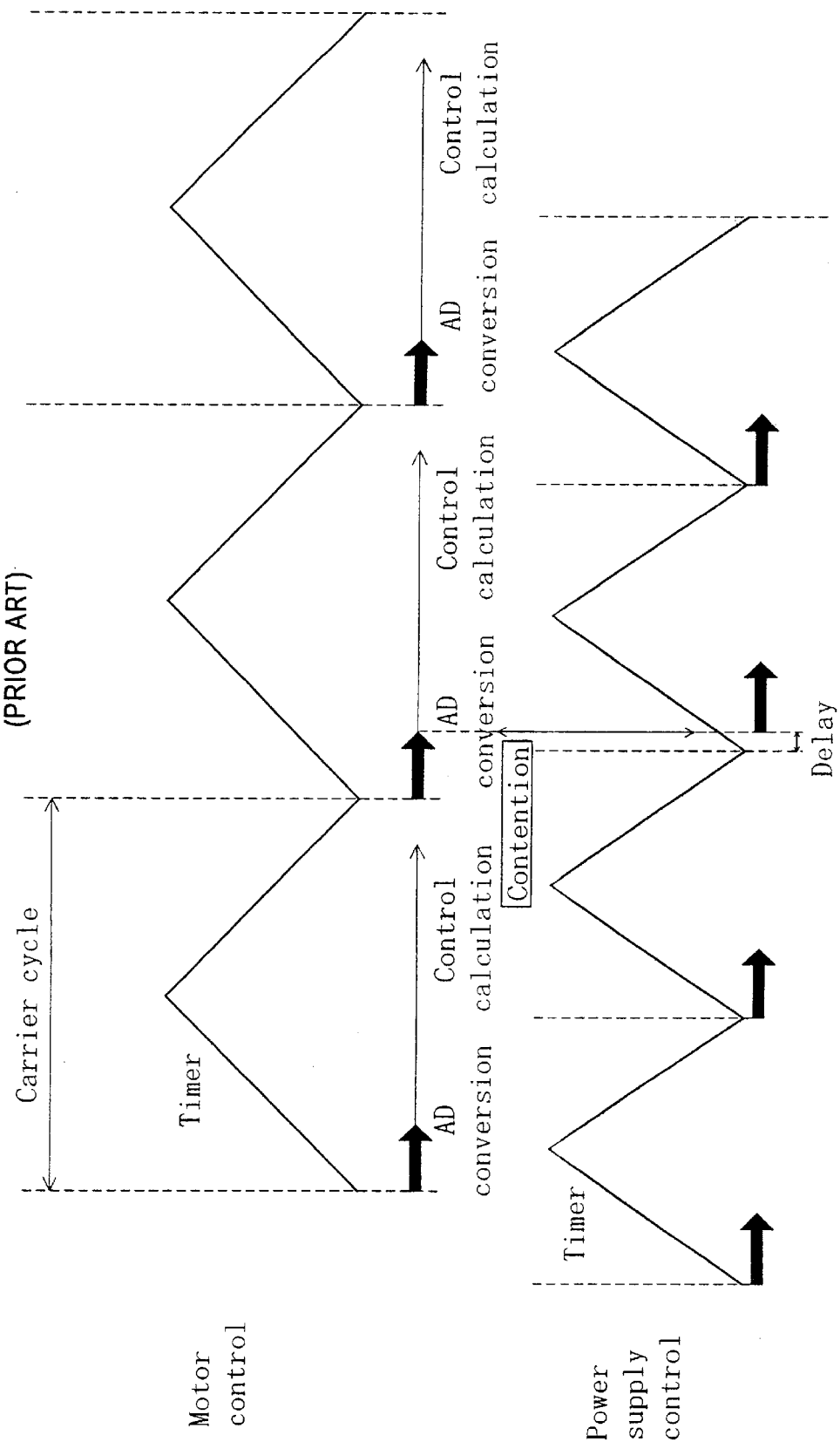
FIG. 5 is a conceptual diagram illustrating a contention between an AD conversion for a motor control and that for a power supply control.

The carrier frequency is determined depending upon the object to be controlled and in view of noise, efficiency, etc. A motor control and a power supply control normally have their suitable carrier frequencies different from each other because the object to be controlled is different. Where a motor control and a power supply control have different carrier frequencies, their timings of AD conversion will certainly contend with each other for every certain number of carrier cycles, even if the start timing of a motor control is shifted from that of a power supply control in an attempt to prevent their timings of AD conversion from contending with each other, as illustrated in FIG. 5. Thus, an AD conversion contention occurs, thereby necessitating either one of the AD conversions to be delayed.

Of course, it is possible to avoid such a contention of AD conversions by, for example, employing the same carrier frequency for a motor control and a power supply control or by setting one of the carrier frequencies to be a multiple of the other. With such a restriction, however, it is practically impossible to set appropriate carrier frequencies for a motor control and for a power supply control.

The delay in the timing of AD conversion as illustrated in FIG. 5 causes problems as will be described below. It is assumed herein that the carrier frequency of a power supply control is 20 kHz (carrier cycle 50 μs) and the time required for an AD conversion is 4 μs. When there is a contention between an AD conversion for a motor control and that for a power supply control, the AD conversion for a power supply control is delayed by up to 4 μs.

First, since the value to be AD-converted (e.g., the current value of the power supply) changes with time, a value that is taken 4 μs after the intended conversion timing is converted due to the delay in the timing of AD conversion. Thus, the original value to be AD-converted is not AD-converted, thereby reducing the control precision.

Moreover, while the amount of time to be used for the control calculation is supposed to be 46 (=50−4) μs, it is shortened to 42 (=50−4−4) μs due to the delay in the timing of AD conversion. Therefore, the control calculation may not be complete within the carrier cycle. Of course, it is possible to avoid such a problem by, for example, increasing the computing power of the CPU to about 110%. However, it will result in modifying the entire microcomputer (including the process and the power supply voltage thereof), thereby increasing the production cost.

In contrast, according to the present embodiment, the AD converters 15a, 15b and 15c can operate individually, whereby an AD conversion for a motor control and that for a power supply control are performed independently of each other. Therefore, even if there is a contention of AD conversions as illustrated in FIG. 5, each AD conversion can be performed without having to wait for the other AD conversion to be completed. Therefore, there is no problems such as the reduction in the control precision. Moreover, it is possible to freely set carrier cycles respectively for a motor control and a power supply control. Therefore, it is possible to perform a control such that the efficiency is maximized.

Where a motor control and a power supply control are performed together as in the present embodiment, it is necessary to add a circuit for a power supply control in the inverter control signal generation circuit 14. However, the circuit to be added is very small with respect to the entire microcomputer, and thus will not cause a substantial increase in the production cost. Moreover, although the number of AD converters to be provided increases, it is possible to perform an optimal control while preventing an increase in the total substrate area. Thus, in view of the system as a whole, an optimal control can be realized at a low cost.

Moreover, when a motor control and a power supply control are performed with a single chip, as in the present embodiment, there is another advantage in that a control of changing the rotational speed of the motor according to the voltage or current of the power supply or a control of changing the voltage or current of the power supply according to the rotational speed of the motor can be easily realized without adding any hardware.

While two of the three AD converters are used for a motor control and the other one for a power supply control in the present embodiment, the three AD converters may all be used for a motor control, in which case another effect can be obtained. That is, in the present embodiment, the motor current is detected for position detection, and therefore it is sufficient to detect two systems of current in the case of a 3-phase motor. When three AD converters are used to detect all of the three phases of the motor voltage, instead of the motor current, it is possible to realize a sinusoidal wave drive with no position sensor and no current sensor.

SECOND EMBODIMENT

While three AD converters are provided in the first embodiment, four or more AD converters may be provided. For example, where four AD converters are provided, two AD converters can be used for a motor control while using the other two AD converters for a power supply control with a higher precision.

FIG. 6A and FIG. 6B are diagrams illustrating a general structure of a motor control device according to a second embodiment of the present invention. As illustrated in FIG. 6A, an inverter control microcomputer 10A, which is a semiconductor device for an inverter control, performs a motor control and a power supply control together while receiving three position detection signals PD1, PD2 and PD3 output from a position detection signal generation circuit 2A, two power supply control input signals SCIN1 and SCIN2 output from a power supply control circuit 3A, and a signal TD output from a temperature sensor 4. The inverter control microcomputer 10A includes six AD converters 16a to 16f, as illustrated in FIG. 6B. Three AD converters 16a, 16b and 16c are used for a motor control, and receive the position detection signals PD1, PD2 and PD3, respectively. Two AD converters 16d and 16e receive power supply control input signals SCIN1 and SCIN2 representing the current and the voltage of the power supply, respectively, and the AD converter 16f receives the signal TD output from the temperature sensor 4.

Thus, with the inverter control microcomputer 10A as illustrated in FIG. 6A and FIG. 6B, three phases of a current or a voltage are simultaneously AD-converted for the control of the motor 1 while the current and the voltage are simultaneously AD-converted for the control of the power supply, with the temperature sensor signal being AD-converted separately. Therefore, it is possible to efficiently control the system as a whole.

THIRD EMBODIMENT

While a single motor is controlled in the first embodiment, there may be more than one motors to be controlled.

Figure 7B:
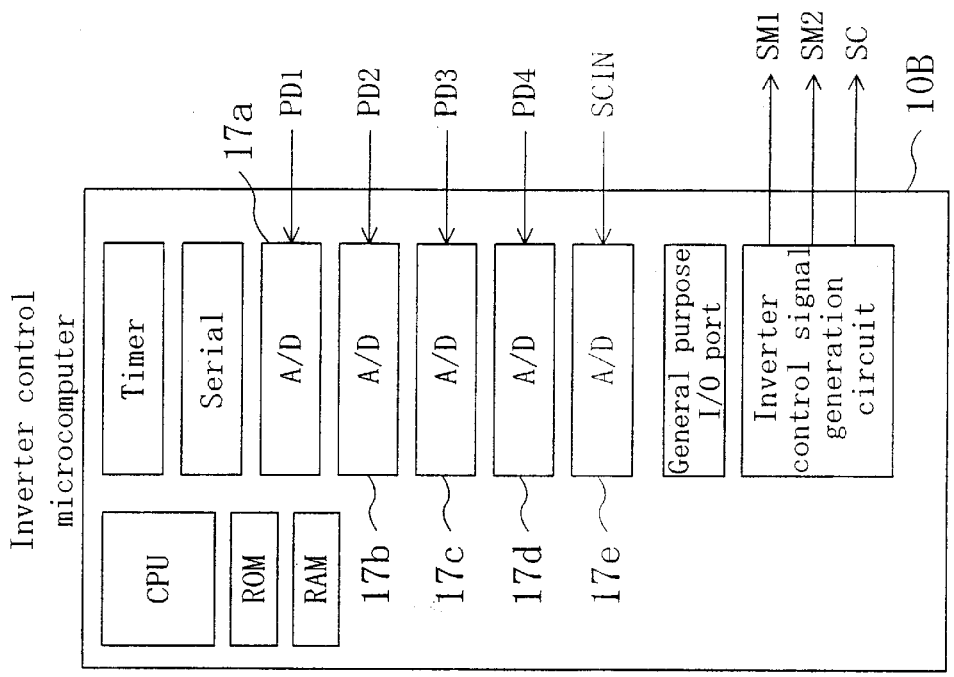
FIG. 7A and FIG. 7B are diagrams illustrating a general structure of a motor control device according to a third embodiment of the present invention.
Figure 7A:
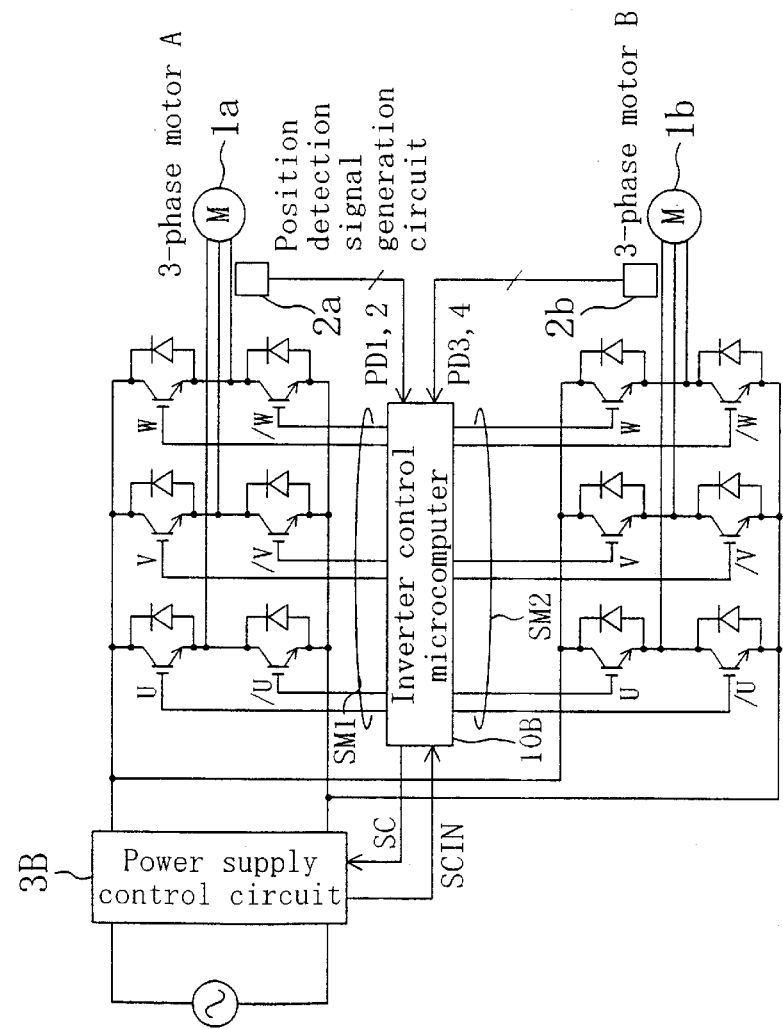
Figure 8A:
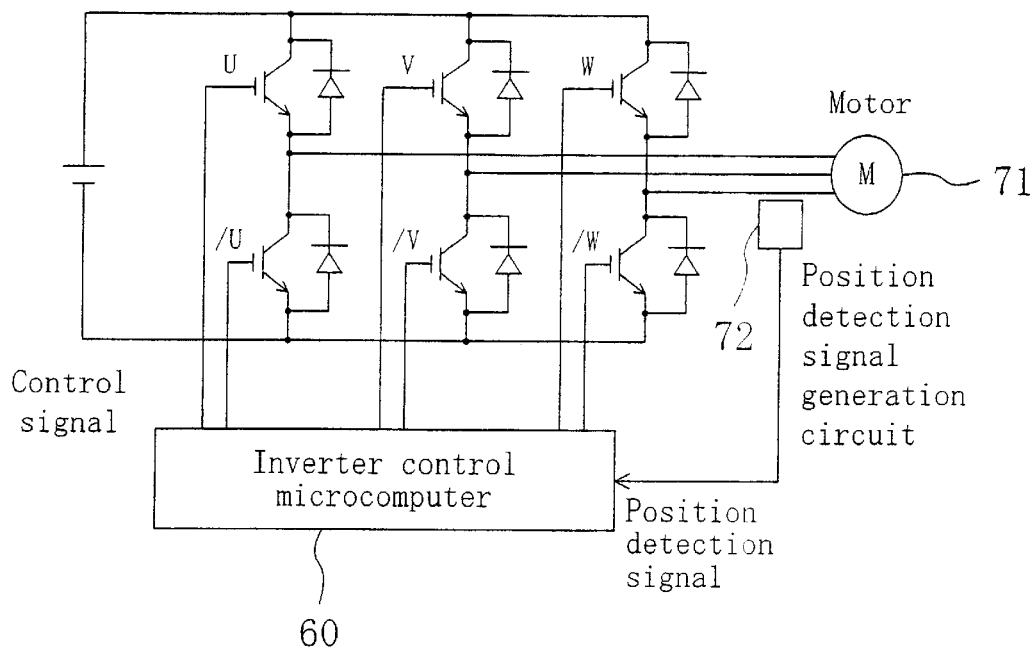
FIG. 8A and FIG. 8B are diagrams illustrating a general structure of a conventional motor control device.
Figure 8B:
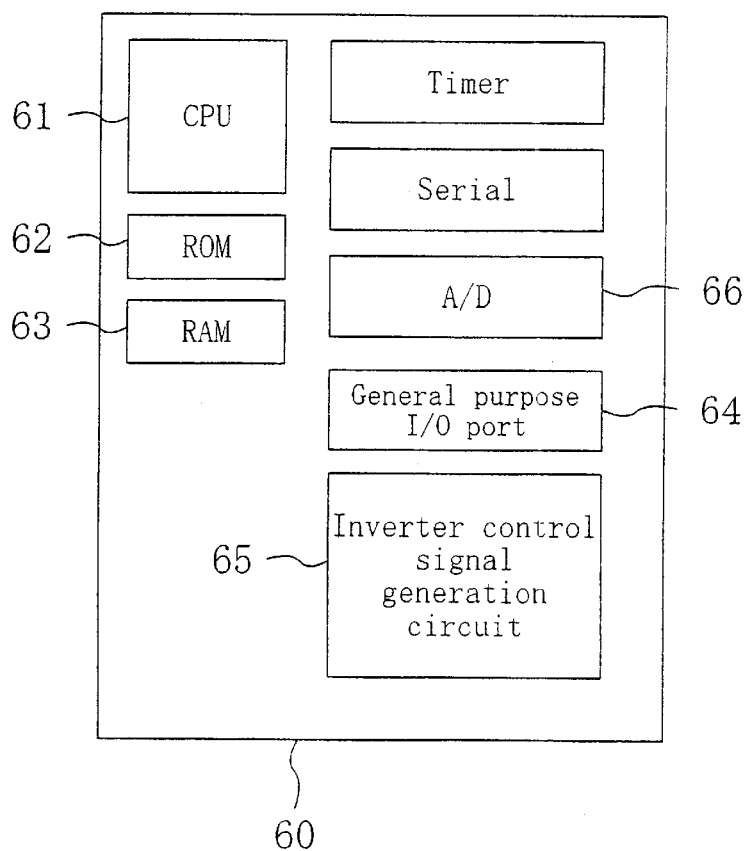
Figure 9:
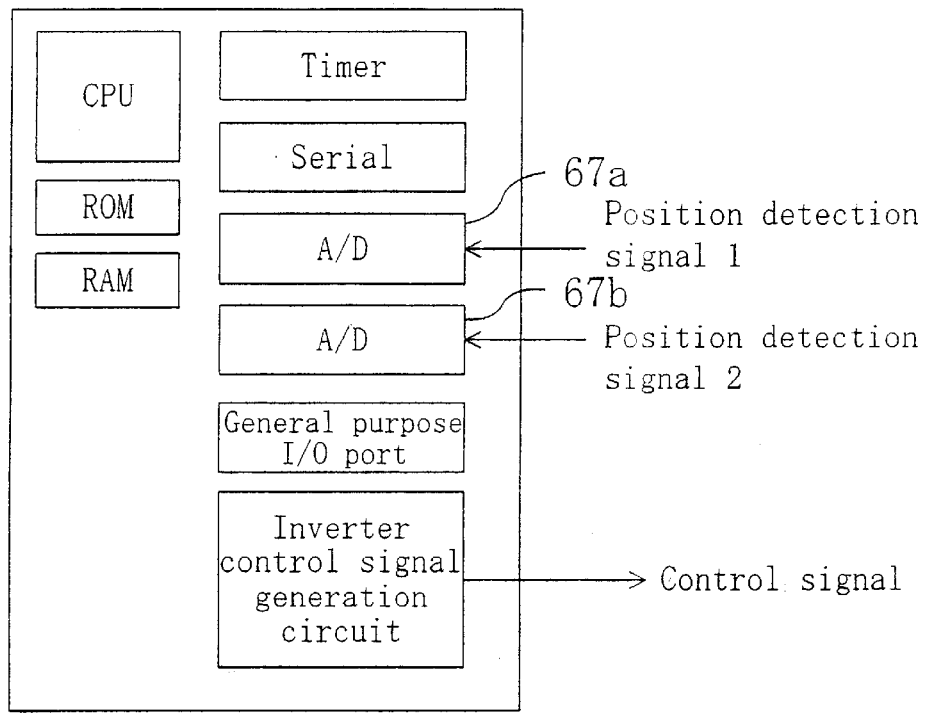
FIG. 9 illustrates an example of a conventional inverter control microcomputer.
Figure 10:
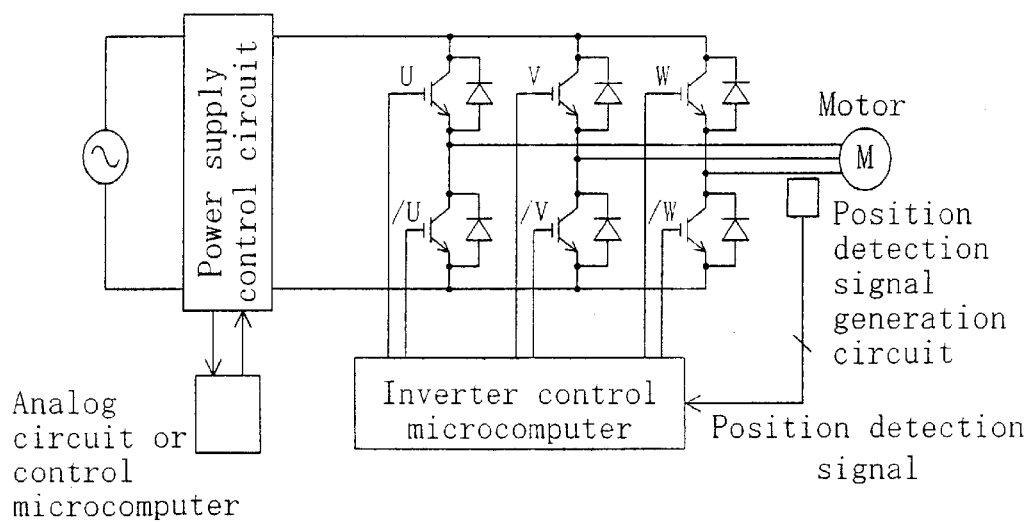
FIG. 10 illustrates an example of a conventional motor control device where a power supply control is also performed.

FIG. 7A and FIG. 7B are diagrams illustrating a general structure of a motor control device according to a third embodiment of the present invention. As illustrated in FIG. 7A, an inverter control microcomputer 10B, which is a semiconductor device for an inverter control, controls two 3-phase motors 1a and 1b and the power supply thereof. Accordingly, the inverter control microcomputer 10B receives two position detection signals PD1 and PD2 output from a position detection signal generation circuit 2a, two position detection signals PD3 and PD4 output from another position detection signal generation circuit 2b, and a power supply control input signal SCIN output from a power supply control circuit 3B. The inverter control microcomputer 10B includes five AD converters 17a to 17e, as illustrated in FIG. 7B. Two AD converters 17a and 17b are used for controlling the first motor 1a and receive the position detection signals PD1 and PD2, respectively. Two AD converters 17c and 17d are used for controlling the second motor 1b and receive position detection signals PD3 and PD4, respectively. The other AD converter 17e is used for a power supply control.

With the structure illustrated in FIG. 7A and FIG. 7B, the motors 1a and 1b are controlled by separate AD converters. Therefore, the precision will not be reduced due to a delay caused by a contention of AD conversions, and it is possible to appropriately control the power supply and the respective motors. Of course, each additional motor can be controlled by adding two AD converters and, in this way, any number of motors can be optimally controlled.

Where a power supply control is not performed, it is possible to control a plurality of motors by separate AD converters by providing twice as many AD converters as the number of motors to be controlled in the inverter control microcomputer.

In the description set forth above, an inverter control of a motor is realized by using a microcomputer. However, the present invention is not limited thereto, but such an inverter control of a motor can alternatively be realized by using any semiconductor device provided with AD converters and a control circuit that generates a control signal using digital signals output from the AD converters, such as, for example, a DSP (Digital Signal Processor).

As described above, according to the present invention, it is possible to optimally perform a power supply control and a motor control independently of each other with a single semiconductor device without adding any hardware and without having to consider any limitation on the timing of AD conversion.

Moreover, it is possible to optimally control a plurality of motors independently of one another. Thus, it is possible to realize a product that satisfies the required energy conserving performance without increasing the production cost.

What is claimed is:

1. A semiconductor device for performing an inverter control of a motor, comprising:

a number of AD converters each converting an input analog signal into a digital signal; and a control circuit for processing the digital signals output from the AD converters so as to generate a control signal, wherein the number of AD converters is three or more, wherein two of the AD converters are used for controlling the motor.

2. The semiconductor device of claim 1, wherein another one of the AD converters is not used for controlling the motor.

3. The semiconductor device of claim 2, wherein said two of the AD converters are operated by a different carrier cycle than said another one of the AD converters.

\* \* \* \* \*